United States Patent [19]
Lee

[11] Patent Number: 5,309,300
[45] Date of Patent: May 3, 1994

[54] BEGINNING/END OF TAPE DETECTION SYSTEM

[75] Inventor: David R. Lee, San Jose, Calif.

[73] Assignee: R-Byte, Inc., San Jose, Calif.

[21] Appl. No.: 740,800

[22] Filed: Aug. 6, 1991

[51] Int. Cl.$^5$ .................. G11B 15/46; G11B 15/43
[52] U.S. Cl. .................. 360/74.2; 360/74.3
[58] Field of Search .................. 360/74.2, 74.3

[56] References Cited

U.S. PATENT DOCUMENTS

| | | | |
|---|---|---|---|
| 3,660,810 | 5/1972 | Yoshii | 360/74.2 |
| 3,823,945 | 7/1974 | Milligan | 360/105 |
| 3,838,453 | 9/1974 | Buslik et al. | 360/70 |
| 3,860,960 | 1/1975 | Akamine | 360/85 |
| 3,883,785 | 5/1975 | Fulcher et al. | 318/314 |
| 3,921,220 | 11/1975 | Primosch et al. | 360/72.3 |
| 4,060,840 | 11/1977 | Umeda | 360/130 |
| 4,215,378 | 7/1980 | Sato et al. | 360/74.2 |
| 4,258,399 | 3/1981 | Iijima et al. | 360/85 |
| 4,408,235 | 10/1983 | Ito | 360/71 |
| 4,410,919 | 10/1983 | Umeda | 360/85 |
| 4,459,625 | 7/1984 | Kawase | 360/85 |
| 4,510,534 | 4/1985 | Maeda | 360/10.3 |
| 4,528,604 | 7/1985 | Koyama | 360/74.2 |
| 4,541,024 | 9/1985 | Seiben | 360/85 |
| 4,599,561 | 7/1986 | Takahashi et al. | 324/208 |
| 4,740,850 | 4/1988 | Ogata | 360/85 |
| 4,742,407 | 5/1988 | Smith et al. | 360/95 |
| 4,758,398 | 7/1988 | Nishida et al. | 360/85 |
| 4,800,450 | 1/1989 | Rodal et al. | 360/73.06 |
| 4,805,053 | 2/1989 | Yamanaka et al. | 360/74.2 |
| 4,811,132 | 3/1989 | Hunter et al. | 360/74.3 |
| 4,833,549 | 5/1989 | Yoshimoto et al. | 360/191 |
| 4,835,629 | 5/1989 | Ueno et al. | 360/53 |
| 4,873,589 | 10/1989 | Inazawa et al. | 360/53 |
| 4,891,644 | 1/1990 | Noro | 341/128 |
| 4,899,233 | 2/1990 | Yoshida | 360/77.14 |
| 4,910,448 | 3/1990 | Tomisawa et al. | 318/599 |
| 4,939,595 | 7/1990 | Yoshimoto et al. | 360/19.1 |
| 4,963,999 | 10/1990 | Utsunomiya et al. | 360/74.2 |

*Primary Examiner*—John S. Heyman
*Attorney, Agent, or Firm*—Lyon & Lyon

[57] ABSTRACT

This invention is a beginning-of-tape/end-of-tape detection apparatus and method for use in a tape drive system having supply reel, take-up reel, and capstan motion sensors. The invention comprises monitoring means for monitoring each of the angular position signals and processor means for computing beginning-of-tape and end-of-tape utilizing the varying diameters of the supply reel and its tape pack and the take-up reel and its tape pack, and angular velocities of the reels and capstan. This invention provides a plurality of systems and methods for BOT/EOT detection with selectable tolerance levels. These include coarser detection without capstan engagement of tape (for use in high-speed spacing operations), finer detection utilizing capstan engagement, and absolute BOT/EOT detection utilizing the physical ends of the tape. This invention has the advantage of accurately determining beginning and end of tape without requiring special detectors.

14 Claims, 1 Drawing Sheet

BEGINNING/END OF TAPE DETECTION SYSTEM

FIELD OF THE INVENTION

The present invention relates generally to the field of magnetic tape drives and more particularly to a beginning-of-tape/end-of-tape detection system and method.

BACKGROUND OF THE INVENTION

A typical two-reel tape recorder has magnetic tape wound on a supply reel, transported over a cylindrical read/write head drum to a take-up reel supplying torque to move the tape. The tape is threaded through and driven by a motorized capstan and pinch roller disposed downstream of the head. The capstan typically controls tape speed. Tape tension is provided by torque control of the supply reel. A tension roller is typically disposed between the head and the supply reel to sense tape tension. Tape motion is typically sensed by a capacitive sensing unit. Beginning of tape (BOT) and end of tape (EOT) are typically sensed by attaching transparent or reflective material at the beginning and end of the tape and utilizing photodetectors and associated circuitry to detect and signal the beginning and end of the tape. Such a BOT/EOT system requires relatively complex circuitry and its attendant costs. Further, optical BOT/EOT sensors fail when debris (for example, dirt from the tape itself) accumulates over them.

SUMMARY OF THE INVENTION

Accordingly, this invention provides a BOT/EOT system which does not use optical sensors. This invention is an apparatus and method for use in a tape drive system having supply reel, take-up reel, and capstan motion sensors. The invention comprises monitoring means for monitoring each of the angular position signals and processor means for computing beginning-of-tape and end-of-tape utilizing the varying diameters of the supply reel and its tape pack and the take-up reel and its tape pack, and angular velocities of the reels and capstan.

This invention provides a plurality of systems and methods for BOT/EOT detection with selectable tolerance levels. These include coarser detection without capstan engagement of tape (for use in high-speed spacing operations), finer detection utilizing capstan engagement, and absolute BOT/EOT detection utilizing the physical ends of the tape. This invention has the advantage of accurately determining beginning and end of tape without requiring special detectors. In fact, the BOT/EOT detection is achieved employing sensors already present in most typical tape drives. Further, there is no requirement for attaching transparent or reflective materials to the tape beginning and end.

A further understanding of the nature and advantages of the present invention may be realized by reference to the Detailed Description of the Invention and the attached drawing.

DETAILED DESCRIPTION OF THE INVENTION

Figure 1:
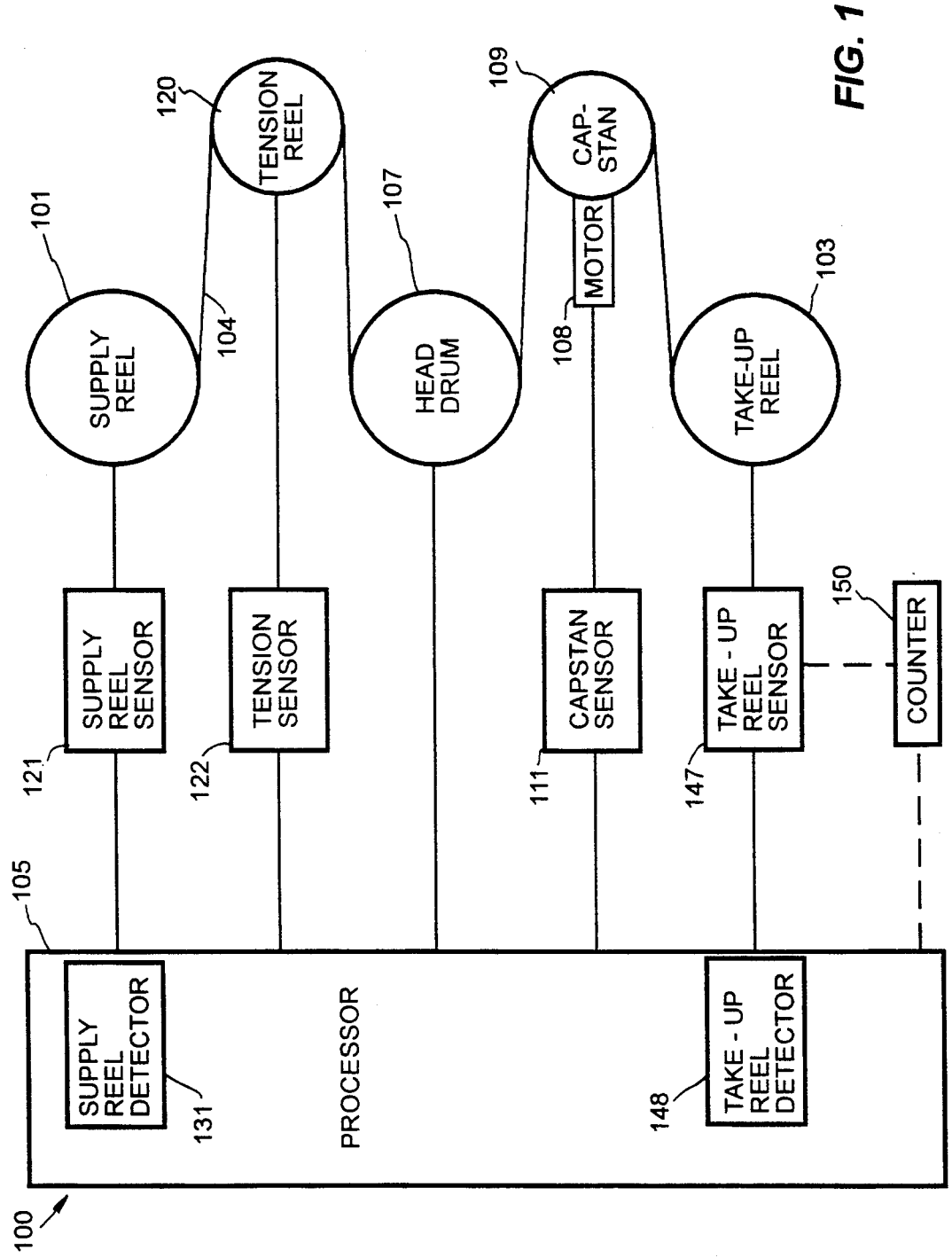
FIG. 1 is a schematic block diagram of one embodiment of a beginning/end of tape (BOT/EOT) detection system according to the present invention.

The beginning and end of tape on a tape drive system is determined by this invention utilizing the angular position or tape speed outputs of sensors on the capstan motor, the supply reel, and the take-up reel together with computations performed by a processor.

FIG. 1 is a schematic block diagram of one embodiment of a beginning/end of tape (BOT/EOT) detection system according to the present invention. A tape drive system 100 has a supply reel 101 coupled to a supply reel motion sensor 121, a capstan 109 coupled to a capstan motor 108 coupled to a capstan motion sensor 111, and a take-up reel 103 coupled to a take-up reel motion sensor 147. Each of the sensors generate a signal indicative of the angular position of supply reel 101, capstan motor 108 and take-up reel 103. A magnetic tape 104 from supply reel 101 is wound about a tension arm pin 120 to which is coupled a tension sensor 122 (pin 120 and sensor 122 constitute a tension transducer). A head drum 107 has mounted thereon read/write heads (not shown) for reading and writing to tape 104. Tape 104 is taken up by take-up reel 103.

Motors (not shown) drive head drum 107 and take-up reel 103. These motors may be independent motors or interconnected. Supply reel 101 typically also has a dedicated motor, but this is not necessary for all cases.

All the sensors are coupled to a processor 105 which serves to monitor the angular position signals from supply reel motion sensor 121, capstan motion sensor 111, and take-up reel motion sensor 147.

Broadly, processor 105 computes the beginning-of-tape and end-of-tape utilizing the varying diameters of the supply reel and tape and the take-up reel and tape, and angular velocities of the supply reel, capstan, and take-up reel, the angular velocities being determined from the angular position signals.

Supply reel sensor 121, capstan sensor 111, and take-up reel sensor 147 may be encoders generating a series of pulses having frequencies proportional to the angular velocities of supply reel 101, capstan 109, and take-up reel 103. These encoders can be used in servo-control systems for regulating tape tension and tape speed. The sensors, therefore, are often already part of a tape drive system as, for example, magneto-resistive encoders on the capstan and optical sensors on the reels.

For the forward tape motion direction, being from the supply reel to the take-up reel, end-of-tape is determined by utilizing the following equation:

$$D_s = D_c \times (V_c / V_s)$$

where $D_s$ is the diameter of the supply reel plus tape, $D_c$ is the diameter of the capstan, $V_x$ is the angular velocity of the supply reel, and $V_c$ is the angular velocity of the capstan. The end-of-tape is detected as the diameter of the supply reel plus a predetermined tolerance measure of tape pack thickness. That is, when the diameter $D_s$ becomes less than or equal to the diameter of the supply reel plus some tolerance thickness of tape pack, end-of-tape is detected.

For the reverse tape motion direction, being from the take-up reel to the supply reel, beginning-of-tape is determined by the processor utilizing the following equation:

$$D_t = D_c \times (V_c / V_t)$$

where $D_t$ is the diameter of the take-up reel plus tape and $V_t$ is the angular velocity of the take-up reel. The beginning-of-tape is detected as the diameter of the take-up reel plus a predetermined tolerance measure of tape pack thickness. That is, when the diameter $D_t$ becomes less than or equal to the diameter of the take-up reel plus some tolerance thickness of tape pack, beginning-of-tape is detected.

The method for determining end-of-tape for the forward tape motion direction is then the following sequence of steps: (1) calculating the angular velocity of the supply reel V. from the supply reel motion sensor; (2) calculating the angular velocity of the capstan $V_c$ from the capstan motor motion sensor; (3) calculating the diameter of the supply reel plus tape $D_s$ utilizing $D_x = D_c \times (V_c/V_s)$; (4) adding a predetermined tolerance measure of tape pack thickness to the tapeless diameter of the supply reel providing an end-of-tape diameter $D_{EOT}$; and (5) signalling end-of-tape when $D_s$ is less than or equal to $D_{EOT}$.

The method for determining beginning-of-tape for the reverse tape motion direction (being from the take-up reel to the supply reel) is the following sequence of steps: (1) calculating the angular velocity of the take-up reel $V_t$ from the take-up reel motion sensor; (2) calculating the angular velocity of the capstan $V_c$ from the capstan motor motion sensor; (3) calculating the diameter of the take-up reel plus tape $D_t$ utilizing $D_t = D_c \times (V_c/V_t)$; (4) adding a predetermined tolerance measure of tape pack thickness to the tapeless diameter of the take-up reel providing a beginning-of-tape diameter $D_{BOT}$; and (5) signalling beginning-of-tape when $D_t$ is less than or equal to $D_{BOT}$.

Sometimes it is desirable to transport tape without the capstan engaged by the tape. An example is during high-speed spacing operations. Under no-capstan-engagement conditions, the diameter of the tape pack on the supply reel is calculated based on the relative angular velocities of the supply and take-up reels. The amount of tape pack on the supply reel plus the amount of tape pack on the take-up reel remains constant as the tape moves from reel to reel.

For the forward tape motion direction (being from the supply reel to the take-up reel), end-of-tape is determined by utilizing the following equations:

$$D_s^2 + D_t^2 = K = D_c^2 V_c^2 [(1/V_s)^2 + (1/V_t)^2]$$

and $$D_s/D_t = V_t/V_s$$

where D is the diameter of the supply reel plus its tape pack, $D_t$ is the diameter of the take-up reel plus its tape pack, K is a constant, $D_c$ is the diameter of the capstan, $V_s$ is the angular velocity of the supply reel, and $V_c$ is the angular velocity of the capstan. Solving for $D_s$, the end-of-tape is detected when $D_s$ is less than the diameter of the supply reel plus a predetermined thickness of its tape pack.

For the reverse tape motion direction (being from the take-up reel to the supply reel), beginning-of-tape is determined by utilizing the same equations immediately above, and solving for $D_t$. The beginning-of-tape is then detected when $D_t$ is less than the diameter of the take-up reel plus a predetermined thickness of its tape pack.

The method of determining beginning-of-tape and end-of-tape with a known capstan diameter $D_c$ then utilizes the following sequence of steps: (1) calculating the angular velocity of the supply reel $V_s$ from the supply reel motion sensor; (2) calculating the angular velocity of the capstan $V_c$ from the capstan motor motion sensor; (3) calculating the angular velocity of the take-up reel $V_t$ from the take-up reel motion sensor; (4) calculating a constant K and solving the equations $$D_s^2 + D_t^2 = K = D_c V_c [(1/V_s) + (1/V_t)]$$

and $$D_s/D_t = V_t/V_s$$

for $D_s$ (for detecting end-of-tape) and for $D_t$ (for detecting beginning-of-tape); (5) adding a predetermined tolerance measure of tape pack thickness to the tapeless diameter of the supply reel providing an end-of-tape diameter $D_{EOT}$ and adding a predetermined tolerance measure of tape pack thickness to the tapeless diameter of the take-up reel providing a beginning-of-tape diameter $D_{BOT}$; and (6) signalling end-of-tape when $D_s$ is less than or equal to $D_{EOT}$ and signalling beginning-of-tape when $D_t$ is less than or equal to $D_{BOT}$.

Since tape transport is more precisely controlled when the capstan is engaged, BOT and EOT may be more accurately determined when the capstan is engaged. Therefore, when transporting tape without capstan engagement, a preferred embodiment of this invention is to establish a conservative tape pack thickness tolerance for EOT/BOT. When this conservative value is reached, tape is returned to capstan engagement and a more accurate EOT/BOT may be determined utilizing the capstan engagement technique described above.

For detecting the absolute beginning and end-of-tape, when the tape end is secured to the supply reel, a supply reel detector 131 is coupled to supply reel sensor 121. Detector 131 detects the cessation of signals from supply reel sensor 121 during a predetermined time period, thereby indicating an absolute end-of-tape. That is, if the tape is secured to the supply reel, at absolute end-of-tape, the supply reel will be inhibited from revolving and the supply reel sensor will not generate motion signals. For detecting the absolute beginning-of-tape, when the tape end is secured to the take-up reel, a take-up reel detector 148 is coupled to take-up reel sensor 147. Detector 148 detects the cessation of the signals during a predetermined time period from take-up reel sensor 147, thereby indicating an absolute beginning-of-tape. This detection of stalls of reel movement is utilized in the preferred embodiment after the BOT/EOT detection using the capstan-engaged system and method. In this way, the tape is less likely to be damaged (stretched) since proximity to BOT/EOT has already been detected and the reels may be slowed down.

In the cases where the tape is not securely attached to the reels, absolute end and beginning of tape can be detected by the present invention by sensing tape looseness. If tension sensor 122 senses a substantial change in tension, it is an indication that tape 104 is loose and that absolute physical beginning or end of tape has been reached. In the preferred embodiment, this absolute BOT/EOT detection is utilized after capstan-engagement detection of BOT/EOT.

In another embodiment of this invention, for detecting beginning-of-tape, a counter 150 is coupled to take-up reel sensor 147 and processor 105. Counter 150 is cleared at BOT. Counter 150 increments for each revolution of take-up reel 103 in the forward (being the supply reel to the take-up reel) direction, and decrements for each revolution of take-up reel 103 in the reverse (being the take-up reel to the supply reel) direction. Beginning-of-tape is then indicated when counter 150 reaches 0. An early warning of BOT can be detected when counter 150 reaches some specified small value close to 0. The take-up reel counter method is particularly useful during high-speed rewind operations.

While the above description provides a full and complete description of the preferred embodiments of the present invention, various modifications, alternate constructions, and equivalents may be employed while still remaining within the scope of the invention. For example, the various means and methods described above may be used in different orders to achieve different objectives. Therefore, the above description and illustrations should not be construed as limiting the scope of the invention which is defined by the following claims.

What is claimed is:

1. In a tape drive system having a supply reel coupled to a supply reel motion sensor, a capstan coupled to a capstan motor coupled to a capstan motion sensor, and a take-up reel coupled to a take-up reel motion sensor, each of the sensors generating a signal indicative of the angular position of the supply reel, the capstan motor and the take-up reel, a beginning-of-tape/end-of-tape (BOT/EOT) detection system comprising:

processor means, coupled to the supply reel motion sensor, the capstan motion sensor, and the take-up reel motion sensor, for computing beginning-of-tape and end-of-tape utilizing the varying diameters of the supply reel and its tape pack and the take-up reel and its tape pack, and angular velocities of the supply reel, capstan, and take-up reel, said angular velocities being determined from the angular position signals, wherein for the forward tape motion direction, being from the supply reel to the take-up reel, end-of-tape is determined by said processor means utilizing:

$$D_s = D_c \times (V_c/V_s)$$

where $D_s$ is the diameter of the supply reel plus tape pack, $D_c$ is the diameter of the capstan, $V_c$ is the angular velocity of the supply reel, and $V_c$ is the angular velocity of the capstan, and the end-of-tape being determined as the diameter of the supply reel plus a predetermined tolerance measure of tape pack thickness.

2. In a tape drive system having a supply reel coupled to a supply reel motion sensor, a capstan coupled to a capstan motor coupled to a capstan motion sensor, and a take-up reel coupled to a take-up reel motion sensor, each of the sensors generating a signal indicative of the angular position of the supply reel, the capstan motor and the take-up reel, a beginning-of-tape/end-of-tape (BOT/EOT) detection system comprising:

processing means, coupled to the supply reel motion sensor, the capstan motion sensor, and the take-up reel motion sensor, for computing beginning-of-tape and end-of-tape utilizing the varying diameters of the supply reel and its tape pack and the take-up reel and its tape pack, and angular velocities of the supply reel, capstan, and take-up reel, said angular velocities being determined from the angular position signals, wherein for the reverse tape motion direction being from the take-up reel to the supply reel, beginning-of-tape is determined by said processor means utilizing:

$$D_t = D_c \times (V_c/V_t)$$

where $D_t$ is the diameter of the take-up reel plus tape pack, $D_c$ is the diameter of the capstan, $V_t$ is the angular velocity of the take-up reel, and $V_c$ is the angular velocity of the capstan, and the beginning-of-tape being determined as the diameter of the take-up reel plus a predetermined tolerance measure of tape pack thickness.

3. In a tape drive system having a supply reel coupled to a supply reel motion sensor, a capstan coupled to a capstan motor coupled to a capstan motion sensor, and a take-up reel coupled to a take-up reel motion sensor, each of the sensors generating a signal indicative of the angular position of the supply reel, the capstan motor and the take-up reel, a beginning-of-tape/end-of-tape (BOT/EOT) capstan-not-engaged-by-tape detection system comprising:

processor means, coupled to the supply reel motion sensor, the capstan motion sensor, and the take-up reel motion sensor, for computing beginning-of-tape and end-of-tape utilizing the varying diameters of the supply reel and tape pack $D_s$ and the take-up reel and tape pack $D_t$ and the substantially constant value of $D_s^2$ plus $D_t^2$, and angular velocities of the supply reel, capstan, and take-up reel, said angular velocities being determined from the angular position signals, wherein for the forward tape motion direction being from the supply reel to the take-up reel, end-of-tape is determined by said processor means utilizing:

$$D_s^2 + D_t^2 = K = D_c^2 V_c^2 [(1/V_s)^2 + (1/V_t)^2]$$

where $D_s$ is the diameter of the supply reel plus its tape pack, $D_t$ is the diameter of the take-up reel plus its tape pack, K is a constant, $D_c$ is the diameter of the capstan, $V_c$ is the angular velocity of the supply reel, and $V_c$ is the angular velocity of the capstan, solving for $D_s$, and the end-of-tape being determined when $D_s$ is less than the diameter of the supply reel plus a predetermined thickness of tape pack.

4. In a tape drive system having a supply reel coupled to a supply reel motion sensor, a capstan coupled to a capstan motor coupled to a capstan motion sensor, and a take-up reel coupled to a take-up reel motion sensor, each of the sensors generating a signal indicative of the angular position of the supply reel, the capstan motor and the take-up reel, a beginning-of-tape/end-of-tape (BOT/EOT) capstan-not-engaged-by-tape detection system comprising:

processor means, coupled to the supply reel motion sensor, the capstan motion sensor, and the take-up reel motion sensor, for computing beginning-of-tape and end-of-tape utilizing the varying diameters of the supply reel and tape pack $D_s$ and the take-up reel and tape pack $D_t$ and the substantially constant value of $D_s^2$ plus $D_t^2$, and angular velocities of the supply reel, capstan, and take-up reel, said angular velocities being determined from the angular position signals, wherein for the reverse tape motion direction being from the take-up reel to the supply reel, beginning-of-tape is determined by said processor means utilizing:

$$D_s^2 + D_t^2 = K = D_c^2 V_c^2 [(1/V_s)^2 + (1/V_t)^2]$$

and $$D_s/D_t = V_t/V_s$$

where $D_s$ is the diameter of the supply reel plus its tape pack, $D_t$ is the diameter of the take-up reel plus its tape pack, K is a constant, $D_c$ is the diameter of the capstan, $V_c$ is the angular velocity of the supply reel, and $V_c$ is the angular velocity of the capstan, solving for $D_t$, and the beginning-of-tape being determined when $D_t$ is less than the diameter of the take-up reel plus a predetermined thickness of tape pack.

5. In a tape drive system having a supply reel coupled to a supply reel motion sensor, a capstan having a capstan diameter $D_c$ and coupled to a capstan motor coupled to a capstan motion sensor, and a take-up reel coupled to a take-up reel motion sensor, each of the sensors generating a signal indicative of the angular position of the supply reel, the capstan motor and the take-up reel, a beginning-of-tape/end-of-tape (BOT/EOT) detection method, comprising the steps of:

calculating the angular velocity of the supply reel $V_s$;
calculating the angular velocity of the capstan $V_c$;
calculating the diameter of the supply reel plus its tape pack $D_s$ utilizing $$D_s = D_c \times (V_c/V_s);$$

adding a predetermined tolerance measure of tape pack thickness to the tapeless diameter of the supply reel providing an end-of-tape diameter $D_{EOT}$; and signalling end-of-tape when $D_s$ is less than or equal to $D_{EOT}$.

6. The method for determining end-of-tape for the forward tape motion direction, being from the supply reel to the take-up reel, of claim 5 further comprising the step of detecting absolute end-of-tape by detecting the cessation of the signals from the supply reel motion sensor during a predetermined time period, thereby indicating absolute end-of-tape.

7. In the tape drive system of claim 5 further including a tension transducer coupled thereto, generating signals indicative of the tape tension, the method of claim 5 for determining end-of-tape for the forward tape motion direction, further comprising the step of detecting absolute end-of-tape by detecting the change of the signals from the tension transducer indicating loose tape, thereby detecting absolute end-of-tape.

8. In a tape drive system having a supply reel coupled to a supply reel motion sensor, a capstan having a capstan diameter $D_c$ and coupled to a capstan motor coupled to a capstan motion sensor, and a take-up reel coupled to a take-up reel motion sensor, each of the sensors generating a signal indicative of the angular position of the supply reel, the capstan motor and the take-up reel, a method for determining beginning-of-tape for the reverse tape motion direction being from the take-up reel to the supply reel, comprising the steps of:

calculating the angular velocity of the take-up reel $V_t$;
calculating the angular velocity of the capstan $V_c$;
calculating the diameter of the take-up reel plus tape pack $D_t$ utilizing $$D_t = D_c \times (V_c/V_t);$$

adding a predetermined tolerance measure of tape pack thickness to the tapeless diameter of the take-up reel providing a beginning-of-tape diameter $D_{BOT}$; and signalling beginning-of-tape when $D_t$ is less than or equal to $D_{BOT}$.

9. The method for determining beginning-of-tape for the reverse tape motion being from the take-up reel to the supply reel, of claim 8 further comprising the step of detecting absolute beginning-of-tape by detecting the cessation of the signals from the take-up reel sensor during a predetermined time period, thereby indicating absolute beginning-of-tape.

10. In the tape drive system of claim 8 further including a tension transducer coupled thereto, generating signals indicative of tape tension, the method of claim 8 for determining beginning-of-tape for the reverse tape motion direction, further comprising the step of detecting absolute beginning-of-tape by detecting the change of the signals from the tension transducer indicating loose tape, thereby detecting absolute beginning-of-tape.

11. In a tape drive system having a supply reel coupled to a supply reel motion sensor, a capstan having a capstan diameter $D_c$ and coupled to a capstan motor coupled to a capstan motion sensor, and a take-up reel coupled to a take-up reel motion sensor, each of the sensors generating a signal indicative of the angular position of the supply reel, the capstan motor and the take-up reel, a beginning-of-tape/end-of-tape (BOT/EOT) capstan-not-engaged-by-tape detection method for computing end-of-tape comprising the steps of:

calculating the angular velocity of the supply reel $V_s$;
calculating the angular velocity of the capstan $V_c$;
calculating the angular velocity of the take-up reel $V_t$;
calculating a constant K and solving the following equations $$D_s^2 + D_t^2 = K = D_c^2 V_c^2 [(1/V_s)^2 + (1/V_t)^2]$$

and $$D_s/D_t = V_t/V_s$$

where $D_s$ is the diameter of the supply reel plus its tape pack, $D_t$ is the diameter of the take-up reel plus its tape pack, K is a constant, and $D_c$ is the diameter of the capstan, for $D_s$;

adding a predetermined tolerance measure of tape pack thickness to the tapeless diameter of the supply reel providing an end-of-tape diameter $D_{EOT}$; and signalling end-of-tape when $D_s$ is less than or equal to $D_{EOT}$.

12. In a tape drive system having a supply reel coupled to a supply reel motion sensor, a capstan having a capstan diameter $D_c$ and coupled to a capstan motor coupled to a capstan motion sensor, and a take-up reel coupled to a take-up reel motion sensor, each of the sensors generating a signal indicative of the angular position of the supply reel, the capstan motor and the take-up reel, a beginning-of-tape/end-of-tape (BOT/-EOT) capstan-not-engaged-by-tape detection method for computing beginning-of-tape comprising the steps of:

calculating the angular Velocity of the supply reel $V_s$;

calculating the angular velocity of the capstan $V_c$;

calculating the angular velocity of the take-up reel $V_t$;

calculating a constant K and solving the following equations $$D_s^2 + D_t^2 = K = D_c^2 V_c^2 [(1/V_s)^2 + (1/V_t)^2]$$

and $$D_s/D_t = V_t/V_s$$

where $D_s$ is the diameter of the supply reel plus its tape pack, $D_t$ is the diameter of the take-up reel plus its tape pack, K is a constant, and $D_c$ is the diameter of the capstan, for $D_t$;

adding a predetermined tolerance measure of tape pack thickness to the tapeless diameter of the take-up reel providing a beginning-of-tape diameter $D_{BOT}$; and signalling beginning-of-tape when $D_t$ is less than or equal to $D_{BOT}$.

13. A beginning-of-tape/end-of-tape detection system comprising:

a supply reel having supply reel diameter;

a supply reel encoder, said supply reel encoder generating pulses at a frequency proportional to angular velocity of said supply reel;

a capstan having capstan diameter, said capstan driven by a capstan motor;

a capstan encoder, said capstan encoder generating pulses at a frequency proportional to angular velocity of said capstan;

a take-up reel having take-up reel diameter;

a take-up reel encoder, said take-up reel encoder generating pulses at a frequency proportional to angular velocity of said take-up reel;

a processor, said processor in electrical communication with said supply reel encoder, said capstan encoder and said take-up reel encoder, said processor utilizing said pulses generated by said supply reel encoder, said pulses generated by said capstan encoder and said pulses generated by said take-up reel encoder to calculate supply reel speed, capstan speed and take-up reel sped, wherein when tape is driven forward, said processor divides said capstan speed by said supply reel speed and multiplies the product thereof by said capstan diameter in order to determine supply reel plus tape diameter, said processor indicating an end-of-tape when the supply reel plus tape diameter is equal to or less than the supply reel diameter plus a predetermined tolerance measure of tape pack thickness and wherein when said tape is driven backwards, said processor divides said capstan speed by said take-up reel speed and multiplies the product thereof by said capstan diameter in order to determine take-up reel plus tape diameter and indicates a beginning-of-tape when the take-up reel plus tape diameter is equal to or less than the take-up reel diameter plus a predetermined tolerance measure of tape pack thickness.

14. The beginning-of-tape/end-of-tape detection system of claim 13 further comprising:

a tension pin and a tension pin sensor, said tension pin sensor generating a loose tape signal when said tension pin sensor senses a substantial change in tape tension;

said processor indicating an absolute end-of-tape when said supply reel encoder ceases to generate said pulses during a predetermined time period or when said loose tape signal is received; and said processor indicating an absolute beginning-of-tape when said take-up reel encoder ceases to generate said pulses during a predetermined time period or when said loose tape signal is received.

* * * * *